UNITED STATES PATENT OFFICE.

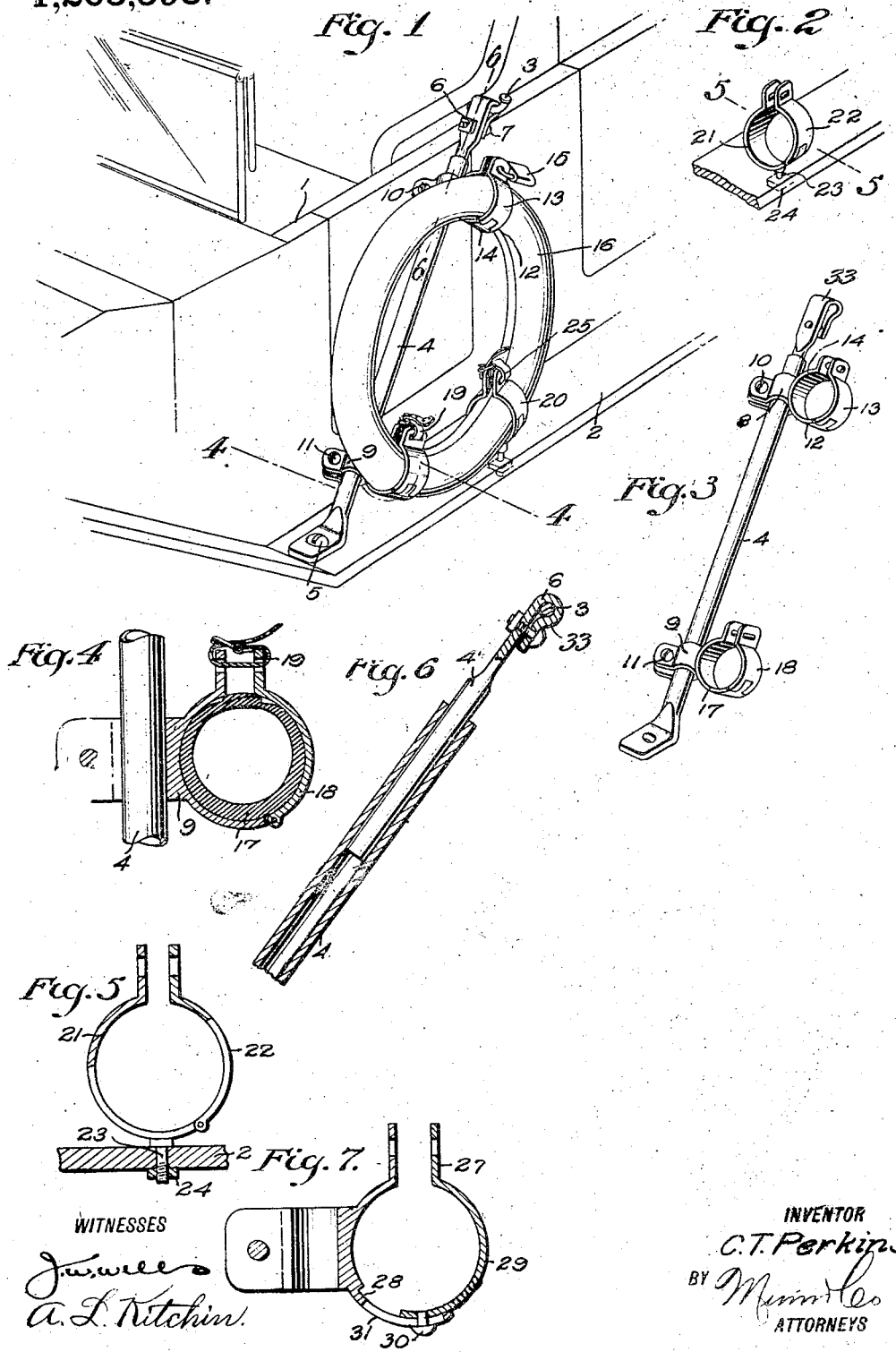

CHARLES THOMAS PERKINS, OF MOOSE JAW, SASKATCHEWAN, CANADA.

TIRE-HOLDER.

1,203,398.  Specification of Letters Patent.  Patented Oct. 31, 1916.

Application filed June 16, 1915. Serial No. 34,540.

*To all whom it may concern:*

Be it known that I, CHARLES T. PERKINS, a citizen of the Dominion of Canada, and a resident of Moose Jaw, in the Province of Saskatchewan, Dominion of Canada, have invented a new and Improved Tire-Holder of which the following is a full, clear, and exact description.

This invention relates to tire holders and particularly to an improved tire holder used on automobiles, and has for an object the provision of such a structure as will properly hold a tire in position on any form of automobile so that the same may be readily removed at any time.

Another object in view is to provide a holder which may be secured to substantially any part of the automobile and yet operate effectively for holding a tire in place.

A still further object in view is to provide a holder for extra tires which may be applied to an automobile quickly and easily and which is formed with compensating means for taking up the various movements between the parts of the automobile to which the holder is secured.

In the accompanying drawings: Figure 1 is a perspective view of part of an automobile, an embodiment of the invention being shown applied thereto; Fig. 2 is a detail perspective view of one of the clamps used in holding an extra tire in place; Fig. 3 is a detail perspective view of the holding bar with a pair of clamps connected therewith; Fig. 4 is a detail fragmentary sectional view through Fig. 1 on line 4—4, the same being shown on a slightly enlarged scale; Fig. 5 is a sectional view through Fig. 2 on line 5—5; Fig. 6 is a sectional view through Fig. 1 approximately on line 6—6; Fig. 7 is a sectional view similar to Fig. 4 but disclosing a modified form of clamp.

Referring to the accompanying drawings by numerals, 1 indicates an automobile of any desired kind which is provided with a running board 2 and with a bracket 3. A bar 4 is connected to the running board 2 by any suitable means, as for instance screw 5, said bar engaging telescopic auxiliary bar 4' which is hooked over bracket 3 at 6 and clamped together by a suitable bolt 7. This sliding connection allows for a movement between bracket 3 and the running board 2 or other part of the automobile to which the bar 4 may be connected.

Clamps 8 and 9 are slidably mounted upon bar 4 and clamped rigidly in position at any point on bar 4 by suitable screws 10—11 whereby the same may be adjusted to suit any sized tire supported by the device. Clamp 8 is provided with a clasp 12 formed with a portion rigidly secured to the clamp and a hinge portion 13. A rigid portion 14 and the hinge portion 13 are each provided with upturned ears which are apertured so as to receive the bolt of lock 15 whereby the tire 16 is locked against removal. The clamp 9 is provided with a stationary member 17 and a hinge member 18 forming a tire clamp. Members 17 and 18 are each provided with ears through which a strap 19 is passed, said strap being provided with a buckle or other suitable means whereby member 8 may be clamped against tire 16.

The tire supporting clamps connected with clamps 8 and 9 sometimes are sufficient to properly hold tire 16 in place, but usually a third clamp 20 is provided, which clamp is formed with a stationary part 21, a hinge part 22 and a threaded standard 23 which receives the nut 24 so that the clamp may be rigidly secured to the running board 2.
The members 21 and 22 are provided with ears for receiving a strap 25 which is held in position by a suitable buckle so that the hinge member 22 may properly press tire 16. By providing the hinge members of the respective clamps the tire may be readily applied and removed, and also, tires of various sizes may be held in place. If desired, the clamps may be constructed without the hinge portion, in which instance it will be necessary to make the clamps sufficiently resilient to allow the clamps to spring when the tire is placed in position or removed. Also, it may be found desirable to make the clamps adjustable in size, as shown in Fig. 10, where the clamp 27 is provided with a stationary part 28 and a bodily movable part 29. A rivet or screw 30 engages the part 29 and passes through a suitable slot 31 in the stationary part 28, whereby the clamp may be adjusted back and forth as desired.

By the construction and arrangement described it will be seen that a simple and strong tire holder or support is provided which may be connected to an automobile quickly and easily without marring the automobile, as shown in Fig. 1, or may be connected quickly and easily to some other part without injuring or marring the part to which the device is connected.

What I claim is:

1. In a tire holder of the character described, a supporting bar formed with a fixed section and a telescoping or sliding section, a pair of bar clamps adjustably clamped to said fixed bar, a tire clamp rigidly connected with each of said bar clamps, and means for causing said tire clamps to clamp the tire therein.

In testimony whereof I have signed my name to this specification in the presence of two subscribing witnesses.

CHARLES THOMAS PERKINS.

Witnesses:
 HAROLD F. PIERCE,
 MAYME C. YOUNG.